Oct. 2, 1962 T. SCHOFIELD ET AL 3,056,571
HOSE HOLDER
Filed Nov. 17, 1960 2 Sheets-Sheet 2
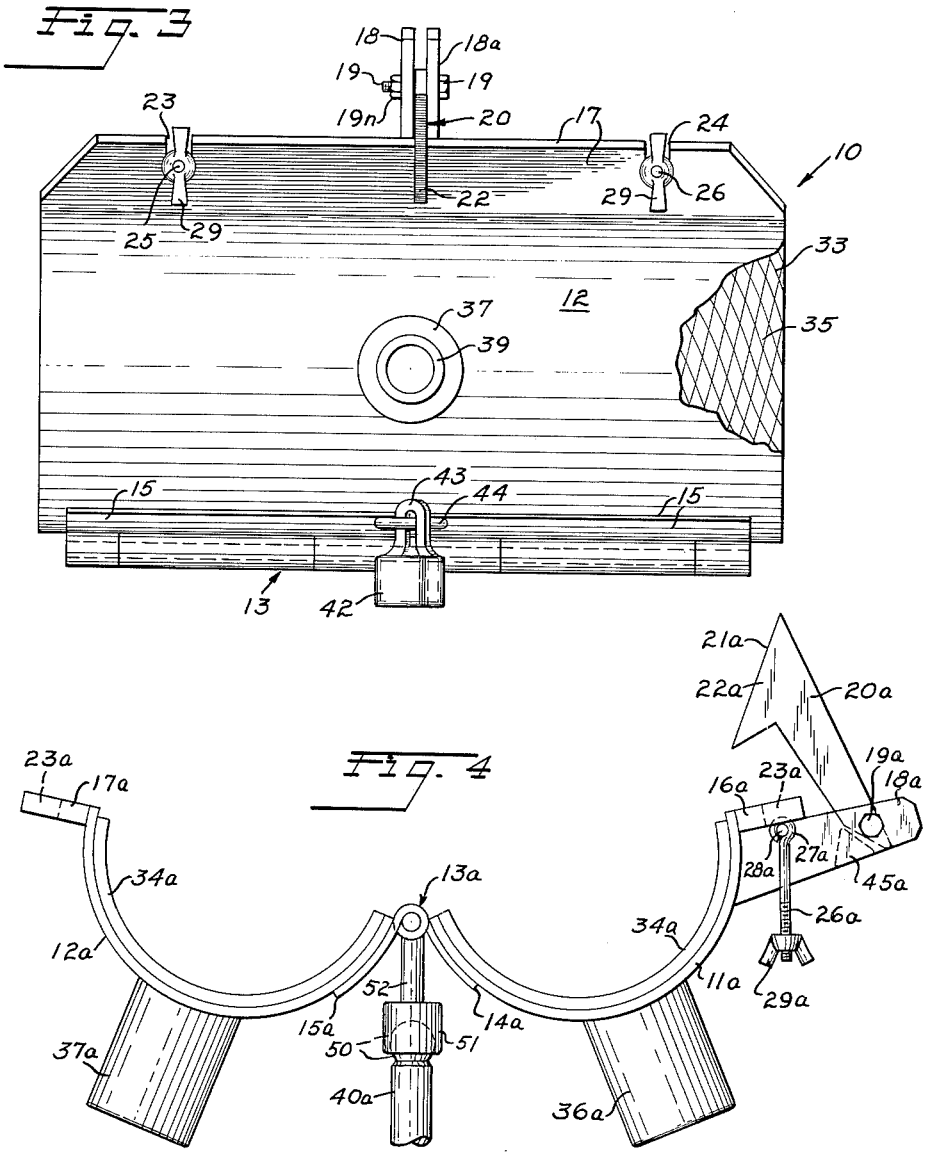
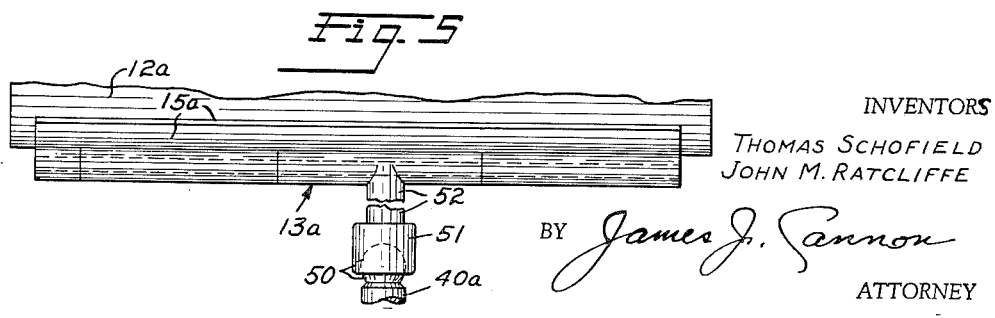
INVENTORS
THOMAS SCHOFIELD
JOHN M. RATCLIFFE
BY James J. Cannon
ATTORNEY United States Patent Office 3,056,571
Patented Oct. 2, 1962

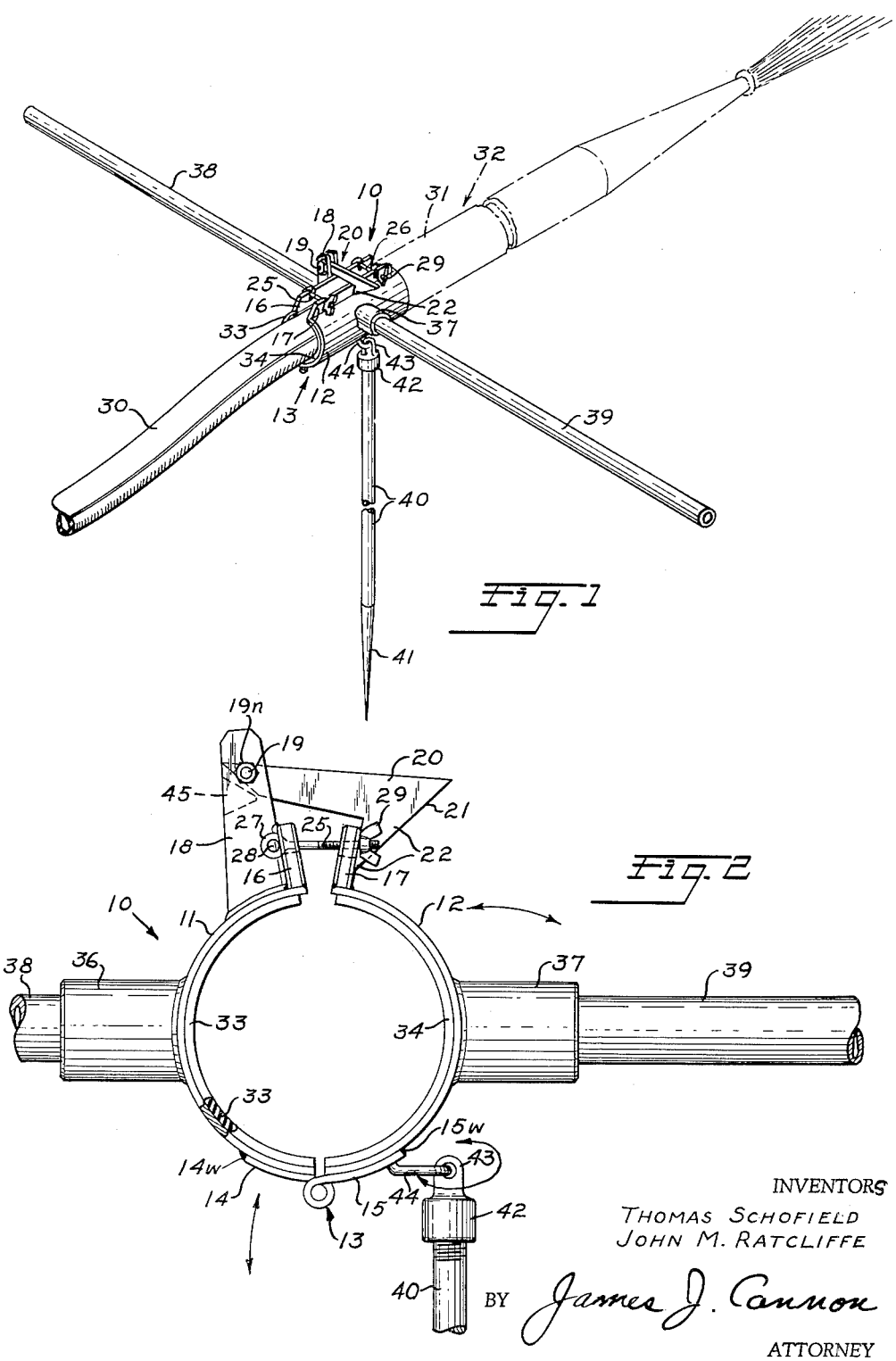

3,056,571
HOSE HOLDER
Thomas Schofield, 172 Jasper St., Paterson, N.J., and John M. Ratcliffe, 51 Mayia Road, Wayne, N.J.
Filed Nov. 17, 1960, Ser. No. 69,942
8 Claims. (Cl. 248—75)

The present invention relates to a hose holder and it consists in the combinations, constructions and arrangements of parts herein described and claimed.

Generally there is provided a pair of semi-cylindrical hose clamping members interconnected by hinge means along adjacent longitudinally disposed edges so that the clamping members may be quickly and easily separated for the hose or the cylindrical base of the nozzle for the hose between said members, after which said members are closed in hose gripping engagement. The parallel edges of the clamping members are provided with narrow radially outwardly directed flanges welded to said edges or formed integrally therewith. A self-locking latch is fixed to one of said flanges and has a detent engaging the other flange to hold the clamping members in hose gripping positions. There are also provided additional clamping means, such as eye bolts fixed by their eyes to one of said flanges and having the other end of the eye bolts received in inwardly directed notches in the other flange, and wing nuts on said bolts for drawing said flanges tightly together for clamping the hose in the holder.

The holder is adapted for being easily held by two firemen, one on each side of the device, by a pair of internally threaded sleeves fixed at one end to the central portion of each clamping member and extending radially therefrom on opposite sides of the holder. Said sleeves are adapted to have screwed therein the threaded ends of pipes or bars which serve as handles for the hose holder. At or closely adjacent the center of the hinge means for connecting the two clamping members together, is a fixture adapted to have vertically connected thereto a post for supporting the holder, to relieve the firemen or other operators of the burden of supporting the weight of the hose and nozzle. The post connecting fixture includes a universal joint whereby the hose may be freely swung in all directions.

The inner faces of the clamping members are desirably covered with a layer of rubber or other resilient material, the surface of which is provided with a high friction tread, the purposes of the lining to provide a firm and reliable gripping of the hose or the nozzle base, without marring or otherwise damaging the same.

It is accordingly a principal object of the invention to provide a hose holder, the parts of which can be very quickly and easily assembled into a functional unit.

It is another object to provide a device of the character set forth which can be very quickly and easily connected to the hose or nozzle to be supported thereby.

It is a further object to provide a device of the herein disclosed type having handles rigidly attached and extending laterally from each side of the holder whereby the hose may be manipulated by half the number of firemen that hoses of conventional construction require.

It is yet another object to provide a holder of this type having a supporting post connected to the lower central portion of holder to relieve the firemen of the burden of supporting the weight of the hose and nozzle.

It is another object to provide a hose holder having a high-friction lining of resilient material for firmly yet safely gripping the hose or the nozzle base therein.

It is a further object to provide a hose holder having a pair of semi-cylindrical gripping members, a pair of edges of which are hingedly joined while the other pair of edges are provided with outwardly directed flanges carrying a first automatically operating means for holding the flanges in hose gripping position and second more positively acting means for drawing the flanges together in hose gripping relative movements.

It is the overall object of the invention to provide a device of the character set forth which is simple in construction, inexpensive to manufacture and yet effective and efficient in use.

Other and further objects of the invention will become apparent from a reading of the following specification taken in conjunction with the drawings, in which:

FIGURE 1 is a perspective view of a preferred embodiment of the invention,

FIGURE 2 is an enlarged rear end elevational view of the showing FIGURE 1,

FIGURE 3 is a side elevational view, partly broken away, viewed from the right side of the showing of FIGURE 2, FIGURE 4 is an end elevational view similar to FIGURE 2, but disclosing a modified form of the invention, and FIGURE 5 is a fragmentary side elevational view of the species of FIGURE 4.

With reference now to FIGURES 1, 2 and 3 of the drawings, the numeral 10 generally designates the hose holder. Holder 10 comprises basically a pair of semi-cylindrical clamping members 11 and 12, which may be cast of any suitable metal or alloy, or may be conveniently formed by longitudinally and diametrically cutting a section of pipe of sufficient diameter and strength. The lower contiguous edges of the members 11 and 12 are connected by a hinge means generally designated 13, the cylindrical wing-like portions 14 and 15 of which may be welded or otherwise affixed to the adjacent edges mentioned.

The upper edges of the members 11 and 12 have welded or otherwise fixed thereto a mating pair of radially disposed flange elements 16 and 17. A bifurcated post 18 of heavy sheet metal is fixed centrally of the clamping member 11 and extends upwardly therefrom immediately behind the flange element 16. Post 18 is welded to the parts 11 and 16 where the same are engaged by said post. The upper or outer end of the post 18 is apertured to receive the bolt 19, which serves as a pivot pin for the gravity operated automatic latch device. Latch device 20 has a camming surface 21 which engages the flange 17 as the members 11 and 12 are moved into the hose clamping position of FIGURES 1 and 2. The catch portion 22 of the latch 20 drops behind the outer surface of the flange 17 to hold the clamping members 11 and 12 in hose embracing position.

Both flanges 16 and 17 are provided with transversely aligned pairs of apertures 23 and 24 through which the eye bolts 25 and 26, the eyes 27 of the eye bolts 25 and 26 are anchored to the flange 16 for swinging in a vertical plane up from or down into the aligned apertures or notches 23 and 24, about the axis of the pins 28, the ends of which are welded to the flange 16 on each side of the notch 23 or 24.

Wing nuts 29 are engaged over threaded free ends of the eye bolts 25 and 26 to firmly squeeze the clamping members 11 and 12 into engagement with the hose 30 and/or the base 31 of the nozzle 32.

In order to effect a more secure holding of the hose 30 or the nozzle 31 in the holder 10, clamping members 11 and 12 are lined with a layer of rubber or other similar resilient material to provide the cushioning pads 33 and 34. Pads 33 and 34 are desirably provided with a multiplicity of grooves 35 (FIG. 3) to provide an anti-slip tread, in known manner.

Another important feature of the invention lies in the provision of a pair of tubular sockets 36 and 37 welded or otherwise fixed to diametrically opposite surfaces of the clamping members 11 and 12. Sockets 36 and 37 are adapted to receive the ends of the pipes or bars 38 and 39 frictionally, or otherwise removably held therein, as by the use of cooperating threads cut on the mating surfaces. The manipulating bars 38 and 39 are of a length for two handed grasping by a fireman standing on each side of the hose holder 10. However, where exceptionally high main pressures are to be handled each bar 38 and 39 may be long enough for convenient gripping by two men on each bar.

A further important feature of the invention resides in the provision of a post 40 which may be pointed at its lower end 41 for non-slip penetration into the soil or roadway. The point will, however, be preferably blunt for use on concrete. The upper end of support post 40 is capped by a fixture 42 having an upwardly extending eye portion 43. The eye portion 43 receives therethrough the bail of the U-shaped element 44, the ends of which element 44 are then welded to the hinge web 15 closely adjacent the hinge axis. Thus the weight of the hose and nozzle as well as that of the holder 10 are supported by the post 40, thus relieving the firemen of the burden of supporting the dead weight and thus permitting their devoting their energies primarily to manipulating the hose and nozzle and in resisting the thrust of the stream of water issuing from the nozzle.

While the latch 20 for temporarily or initially holding the clamping members 11 and 12 in hose surrounding positions has been shown as being gravity operated, it is apparent that spring means (not shown) could be utilized to hold the latch 20 in its latching positions of FIGURES 1 and 2 and yieldably permitting its being raised as the camming surface 22 engages against the flange 17 during a closing of the holder. The spring could also serve the same functions provided by the stop element 45 shown in FIGURE 2, which stop element, as shown, will limit the upward and downward swinging of the latch 20 to an angle approximating thirty degrees, whereby latch 20 can never be displaced out of automatic latching position.

In the modification of the invention shown in FIGURES 4 and 5, the basic elements are substantially identical to the corresponding elements in the species of FIGURES 1 through 3 above described. However, in order to differentiate the elements of FIGURES 4 and 5 from their counterparts in FIGURES 1 through 3, the letter "a" has been added to the reference numerals applied in describing the first species of the invention.

The species of FIGURES 4 and 5 differentiates from that of FIGURES 1, 2 and 3, in the construction of the universal joint. Said universal joint comprises a ball 50 affixed to the upper end of the post 40a. Ball 50 is universally received in a socket 51 to provide a universal joint of generally conventional construction. Socket 51 is mounted on a post 52 which, in turn, is welded or otherwise rigidly fixed to the hinge generally designated 13a.

In the operation of the device, the support post 40 is screwed into the fixture 42. Then the handling bars 38 and 39 are screwed into the sockets 36 and 37. Next the hose 30 adjacent the nozzle 32 or the base 31 of said nozzle is laid in the opened holder 10, and the holder is then closed over the hose or nozzle so as to cause the latch 20 to automatically engage over the flange 17. This holds the hose and the holder initially assembled and facilitates swinging of the bolts 25 and 26 into the aligned slots 23 and 24, respectively. Finally wing nuts 29 are tightened sufficiently to effect a firm gripping of the hose or nozzle base in the holder 10. One man (or two men if needed) then grasps each of the handling bars 38 and 39 so that the hose is supported between them for convenient manipulation thereof. The pointed lower end 41 of the post 40 will penetrate the earth or pavement upon which it rests and provide a non-slipping support for the holder 10. With the clamp engaging the hose behind the nozzle (FIGURE 1), a third man can direct the nozzle.

While but two forms of the invention have been shown and described herein, it will be readily apparent to those skilled in the art that many minor modifications may be made without departing from the spirit of the invention or the scope of the appended claims.

What is claimed is:

1. A device of the character described, comprising: a pair of substantially semi-cylindrical clamping members, hinge means connecting said clamping members along contiguous edges thereof for relative pivotal movement between hose or nozzle receiving open positions and hose or nozzle clamping closed positions, means for tightly closing said clamping members around a hose or nozzle, latch means for initially and automatically latching said clamping members in hose or nozzle embracing positions to facilitate assemblage and subsequent tightening of said clamping members by said closing means, and a pair of manipulating bars fixed to and extending from diametrically opposite portions of said device.

2. Structure according to claim 1 additionally comprising a supporting post and a universal joint connecting the top of said post to the under portion of said device.

3. Structure according to claim 1, said clamping members being lined with resilient cushioning means providing safe and firm frictional gripping of said hose or nozzle.

4. Structure according to claim 3, said cushioning means having a tread providing surface for better frictional gripping of said hose or nozzle.

5. Structure according to claim 1, said means for tightly closing said clamping members being a pair of outwardly extending flanges fixed to and along the edges of said members opposite said hinge means, said flanges having pairs of transversely aligned radial slots, bolts swivelly fixed at one end of each thereof to one of said flanges for swinging into and from a pair of aligned slots in said flanges, and a wing nut on the free end of each bolt for engagement with the other flange for drawing said flanges toward each other.

6. Structure according to claim 5 additionally comprising an automatically operating latch pivotally connected to one flange and latchable over the other flange for initial holding of said clamping members in clamping positions to facilitate assemblage and subsequent tightening of said members by said bolts and wing nuts.

7. Structure according to claim 1, said manipulating bars being quickly and easily attachable to and detachable from said device by means holding said bars in oppositely extending diametrical alignment.

8. Structure according to claim 7, said last-mentioned means comprising a pair of internally threaded sockets one attached medially to each of said clamping members.

References Cited in the file of this patent

UNITED STATES PATENTS

| 877,012 | Sullivan | Jan. 21, 1908 |
| 1,008,027 | Gleeson | Nov. 7, 1911 |

FOREIGN PATENTS

| 4,615 | Germany | 1878 |
| 667,352 | Great Britain | Feb. 27, 1952 |